(12) United States Patent
Guyomard

(10) Patent No.: US 6,499,871 B1
(45) Date of Patent: Dec. 31, 2002

(54) LIGHTING OR SIGNALLING EQUIPMENT PROVIDED WITH IMPROVED ADJUSTABLE FIXING MEANS AND ASSOCIATED STRUCTURAL ELEMENT FOR MOTOR VEHICLE

(75) Inventor: Jean-Nicolas Guyomard, Le Mesnil Fuguet (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/555,114

(22) PCT Filed: Sep. 24, 1999

(86) PCT No.: PCT/FR99/02282

§ 371 (c)(1),
(2), (4) Date: May 24, 2000

(87) PCT Pub. No.: WO00/17008

PCT Pub. Date: Mar. 30, 2000

(30) Foreign Application Priority Data

Sep. 24, 1998 (FR) .............................. 98 11930

(51) Int. Cl.⁷ ............................................. B60Q 1/068
(52) U.S. Cl. ...................... 362/523; 362/273; 362/428
(58) Field of Search ................................ 362/523, 529, 362/530, 531, 532, 273, 289, 271, 428

(56) References Cited

U.S. PATENT DOCUMENTS

| | | | | | |
|---|---|---|---|---|---|
| 4,731,707 A | * | 3/1988 | McMahan et al. | ........... | 362/306 |
| 4,742,435 A | * | 5/1988 | Van Duyn et al. | ........... | 362/289 |
| 4,747,023 A | * | 5/1988 | Ball et al. | .................. | 362/269 |
| 4,757,428 A | * | 7/1988 | Ryder et al. | ................. | 362/270 |
| 4,965,706 A | * | 10/1990 | Reiland | ..................... | 362/273 |
| 5,390,098 A | * | 2/1995 | Reiland | ..................... | 362/289 |

* cited by examiner

Primary Examiner—Sandra O'Shea
Assistant Examiner—Hargobind S. Sawhney
(74) Attorney, Agent, or Firm—Morgan & Finnegan, LLP

(57) ABSTRACT

The invention concerns a lighting or signalling equipment for a motor vehicle comprising a housing and adjustable means for fixing said housing on a structural part of the vehicle, and stop means countering the headlamp displacement in a specific direction to define a reference position for said headlamp relative to the car body. The invention is characterized in that the adjustable fixing means comprise a rotary fixing member capable of co-operating with said structural part and driving during an initial phase of its rotation means forming a cam capable of urging the equipment in said specific direction. The invention also concerning adapted structural element.

15 Claims, 6 Drawing Sheets

FIG_6

FIG_7

FIG_8

FIG_10a

FIG_10b

FIG_11

LIGHTING OR SIGNALLING EQUIPMENT PROVIDED WITH IMPROVED ADJUSTABLE FIXING MEANS AND ASSOCIATED STRUCTURAL ELEMENT FOR MOTOR VEHICLE

BACKGROUND OF THE INVENTION

The present invention relates in general to the fixing of lighting and/or signaling apparatus into motor vehicles.

Conventionally, a device for fixing a headlamp casing, for example, to the front of a vehicle comprises mounting means which, in a first state known as pre-mounting state, allow slight displacement of the casing with respect to the fixed part onto which it is mounted, particularly in order to make it possible to adjust the position of the glazing of the headlamp with respect to the adjacent bodywork. In a second state, locking is effective, so that the headlamp is fixed into the previously adjusted position.

These devices are more or less complex, and rely in particular on relatively bulky additional pieces mounted on the casing of the headlamp, which exhibits the double drawback of increasing the cost price of the headlamp and the space necessary for housing it under the engine hood.

Moreover, these known devices generally rely on a first locking of the headlamp (pre-mounting) by the use of first means, then on a final fixing by the use of second means, separate from the first ones. This further increases the cost price and complicates the mounting operations.

The present invention aims to remedy these drawbacks of the state of the art and to propose a lighting or signaling apparatus equipped with adjustable fixing means which are very simple and reliable to employ, which are economical to produce, and which moreover offer good inviolability of the apparatus once it has been mounted into the vehicle. A further object of the invention is to propose pre-mounting arrangements designed in keeping with such adjustable fixing means in order further to reinforce the inviolability and avoid play, which is particularly a source of vibration, due to manufacturing tolerances.

Hence the invention, according to a first aspect, proposes a lighting or signaling apparatus for a motor vehicle, including a casing and means for adjustable fixing of the said casing onto a structural part of the vehicle, as well as abutment means opposing a displacement of the headlamp in a given direction in order to define a reference position of the said headlamp with respect to the bodywork of the vehicle, characterized in that the said adjustable fixing means comprise a member for fixing by rotation able to interact with the said structural part and driving a cam-forming means, during an initial phase of its rotation, able to push the apparatus in the said given direction.

Preferred, but not limiting, aspects of the apparatus according to the invention are as follows:

the said fixing member consists of a screw, the said cam-forming means comprises a dowel exhibiting an essentially circular part forming a cam and traversed eccentrically by the said screw, the said screw entrains the said dowel in rotation via the interaction of limited friction between the threading of the screw and a passage formed in the dowel for the screw to pass into, the dowel has a barrel accommodating the said screw and able to be engaged closely in an aperture formed in the said structural part of the vehicle, the said barrel comprises a plurality of branches able to be stressed by the said screw, when it is screwed up, towards a wall of the said structural part delimiting the said aperture, the said dowel consists of two parts linked by at least one frangible area, an inner part being integral in rotation with the screw while an outer part forming [sic] a cam, the said screw is screwed directly into an aperture formed in the structural part of the vehicle, the said cam-forming part acts on a low wall surrounding a housing in which it is held, the casing of the apparatus possesses at least one pre-mounting lug possessing a terminal hooking part and able to interact with an aperture formed in the said structural part.

According to a second aspect, the invention proposes a structural element for a motor vehicle, characterized in that it consists of a single-piece component intended to extend at the front of the vehicle over a substantial part of its width and possessing, in the region of its two lateral extremities, arrangements for the mounting and the fixing of two items of apparatus as defined above, constituting left-hand and right-hand headlamps.

The invention also proposes an assembly of a structural element as defined above and of two items of lighting apparatus as defined above, constituting left-hand and right-hand headlamps.

According to a third aspect, the invention proposes a structural element for a motor vehicle, intended to accommodate at least one item of apparatus the casing of which possesses at least one pre-mounting lug possessing a terminal hooking part and able to interact with an aperture formed in the said structural element, characterized in that it possesses at least one first aperture for accommodating the member for fixing by rotation belonging to the adjustable fixing means of the apparatus, and at least one second aperture intended to accommodate a pre-mounting lug of the apparatus of the apparatus [sic] while allowing it to be displaced in the said given direction, the said second aperture having a width, measured transversely to the said given direction, which reduces when the said slot is traveled along the said given direction.

Advantageously, each second aperture, along the said given direction, comprises a first part with a constant width followed by a second part with a second constant width less than the first one; for example, the said first constant width is greater than the overall thickness of an associated pre-mounting lug, while the second constant width is slightly greater than the thickness of a linking part of the said lug.

In order to compensate for play and avoid vibration, the element may also comprise, in the vicinity of each second aperture, a ramp able to force the associated pre-mounting lug in a direction tending to extract it from the said second aperture.

Finally the invention proposes an assembly of a structural element according to the third aspect above and of at least one lighting or signaling apparatus as it is defined therein.

BRIEF DESCRIPTION OF THE DRAWINGS

Other aspects, aims and advantages of the present invention will emerge better on reading the following detailed description of a preferred embodiment thereof, given by way of non-limiting example and given by reference to the attached drawings, in which.

By reference first of all to FIGS. 1 to 5, a device for adjustable fixing of a lighting or signaling apparatus, such as a headlamp, onto a structural part of a motor vehicle has been represented diagrammatically.

The reference 40 designates a generally flat appendage of a casing of the headlamp, preferably formed in a single piece with it, in which is formed an oblong through aperture 42, this aperture being circumscribed, at a defined distance therefrom, by a low wall 41 defining a likewise oblong interior housing 43, the aperture 42 and the housing 43 both being slightly elongated in the vertical direction. This low wall includes one or more studs 411 projecting axially outwards and defining, via an inward notch, the same number of retaining teeth for an adjusting and locking dowel designated overall by the reference 10.

This dowel 10 possesses a generally flat, disk-shaped part 12 the diameter of which is very slightly less than the width of the oblong space 43 delimited by the low wall 41. Eccentrically with respect to the part 12, a barrel 11 is formed consisting preferably of a series of lugs separated by slots extending in axial-radial planes, so as to ensure that they are deformable.

This barrel includes a generally cylindrical axisymmetric root part 11a, the axis of which is offset with respect to that of the disk 12 so as to establish the abovementioned eccentricity, and a terminal part 11b with the general shape of a re-entrant cone.

This barrel 11 is traversed from end to end by a generally cylindrical passage 13, which narrows with a corresponding conicity in the region of the terminal part 11b of the barrel.

Moreover, the disk-shaped part 12 possesses at least one lug 121, radially projecting and able to interact with the retaining tooth 411 at least provided, in such a way that the dowel 10 can be mounted on the appendage 40 of the headlamp casing by elastically engaging its disk-shaped part 12 in the space defined by the low peripheral wall 41 of the appendage 40 after the barrel 11 has been engaged in the aperture 42 of this same appendage, until the or each lug 121 is engaged below the tooth 411. It will be noted here that the lug or lugs 121 and the retaining tooth or teeth 411 here are for the sole purpose of ensuring the retention of the dowel 10 on the appendage 40 before the mounting operation. In fact, as soon as the rotation of the dowel commences, the interaction between these lugs and these teeth disappears, the abovementioned retaining function becoming superfluous.

The dowel 10 is able to accommodate a screw 30, exhibiting a threading of appropriate diameter and a head, in its through passage.

It can already be observed that, when the dowel 10 is turned with respect to the appendage 40, while being guided by the interaction between the disk-shaped part 12 and the low wall 41, the barrel 11, because of its eccentricity, describes a circle.

The appendage 40, equipped with the dowel 10 and with the screw 30, is able to interact with an arrangement formed on a structural part 20 of the vehicle.

This arrangement consists of a collar 21 which extends on the opposite side of the appendage 40 and which circumscribes a generally cylindrical axisymmetric through aperture 22, the diameter of which is very slightly greater than the outer diameter of the barrel 11 of the dowel 10.

The positioning of the headlamp casing in terms of its appendage 40, with respect to the structural part 20, is carried out in the following way: first of all, as described above, the dowel 10 is mounted in the appendage 40, then the latter is positioned in the vicinity of the outer face of the structural part, opposite the collar 21, in such a way that the barrel 11 is substantially aligned with the aperture 22 of the structural part 20, and an axial movement then engages the barrel 11 into this aperture 22.

Figure 1:
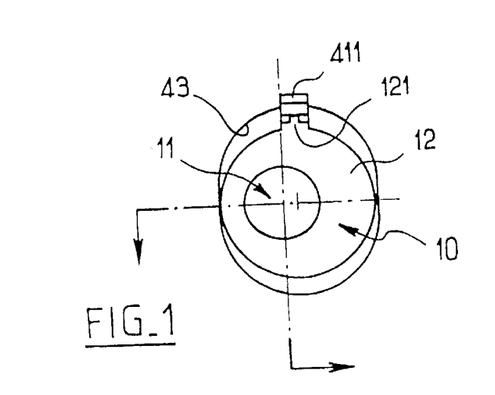
FIG. 1 is a diagrammatic front view of an adjustable mounting device according to the invention.
Figure 2:
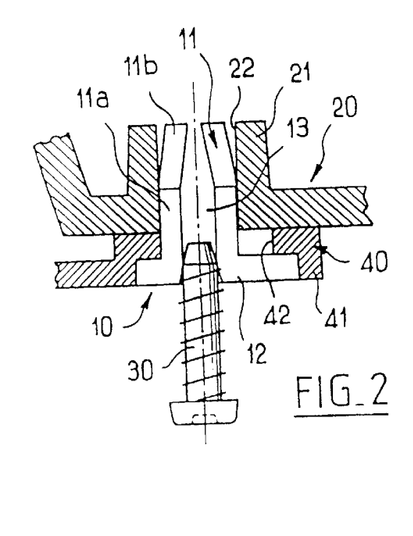
FIGS. 2 to 4 are views in axial vertical section of the device of FIG. 1, in three different positions.
Figure 3:
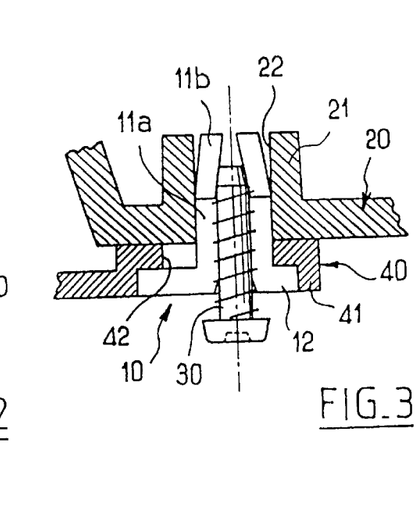
Figure 4:
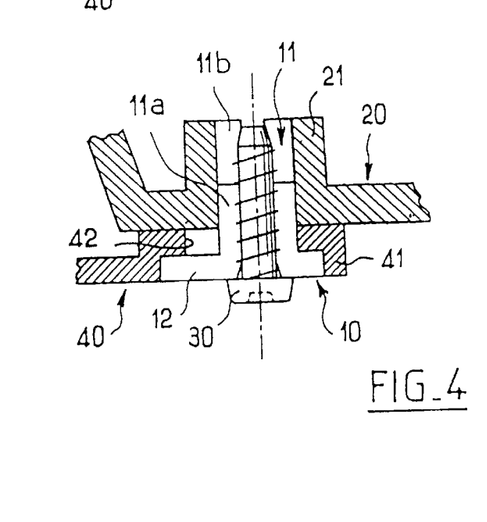
Figure 5:
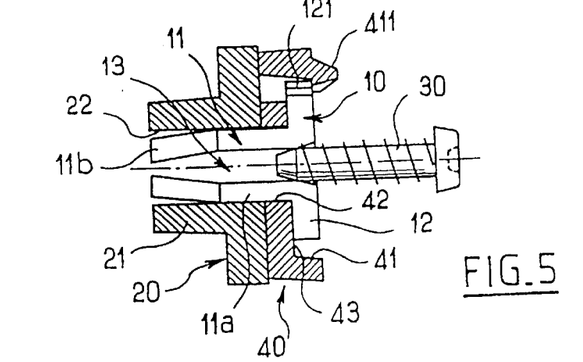
FIG. 5 is a view in axial horizontal section of the device of FIGS. 1 to 4.

The screw 30 then starts to be screwed into the passage 13 of the dowel (FIG. 2). During this phase, the screw 30, via the interaction of the friction between the threading of the screw and the internal wall of the barrel 11, entrains the dowel 10. In the course of this rotation, the eccentricity of the barrel causes the cam-forming disk-shaped part 12 to exert pressure on the appendage 40 in the region of its low wall 41. This causes a lateral movement of the appendage 40 (from right to left, going from FIG. 2 to FIG. 3), and thus of the whole of the headlamp casing in this direction, with respect to the structural part 20. As will be seen in detail later, this movement is such that, in a region of the casing of the headlamp situated at a distance from the adjustable fixing device, it causes the latter to come into abutment against a bodywork element. The translation of the casing is then in fact interrupted, so that the dowel 10 can no longer turn, and the screw 30, continuing to be turned, is this time screwed more completely into the dowel 10 (see FIG. 3), until its free extremity reaches the conical part 11b of the barrel 11, so as strongly to force this part outwards, against the wall of the aperture 22 of the structural element (see FIG. 4). At this stage, the friction between the part 11b thus expanded and the said wall is such that the casing of the headlamp is, at this location, firmly and rigidly linked to the structural part, in the reference position dictated by the abutment mentioned above.

It will be observed here that the oblong shape of the space 43 in the vertical direction is chosen to be sufficient to absorb the whole of the vertical component of the relative movement between the axis of the part 12 of the dowel 10 and the structural part 20 in the course of the rotation; the casing of the headlamp is in effect immobilized in the vertical direction by other means, such as will be described later. It will also be observed that the aperture 42 formed in the appendage 40 is sufficiently large to allow the movements of the barrel 11 therein during the rotation of the dowel 10.

Thus a simple and economical adjustable fixing device is produced, which, in an initial phase, makes it possible to push the headlamp into a reference position in the lateral direction, and, in a final phase, by the same operation of rotational entrainment of a screw, makes it possible to achieve locking in this position.

Figure 6:
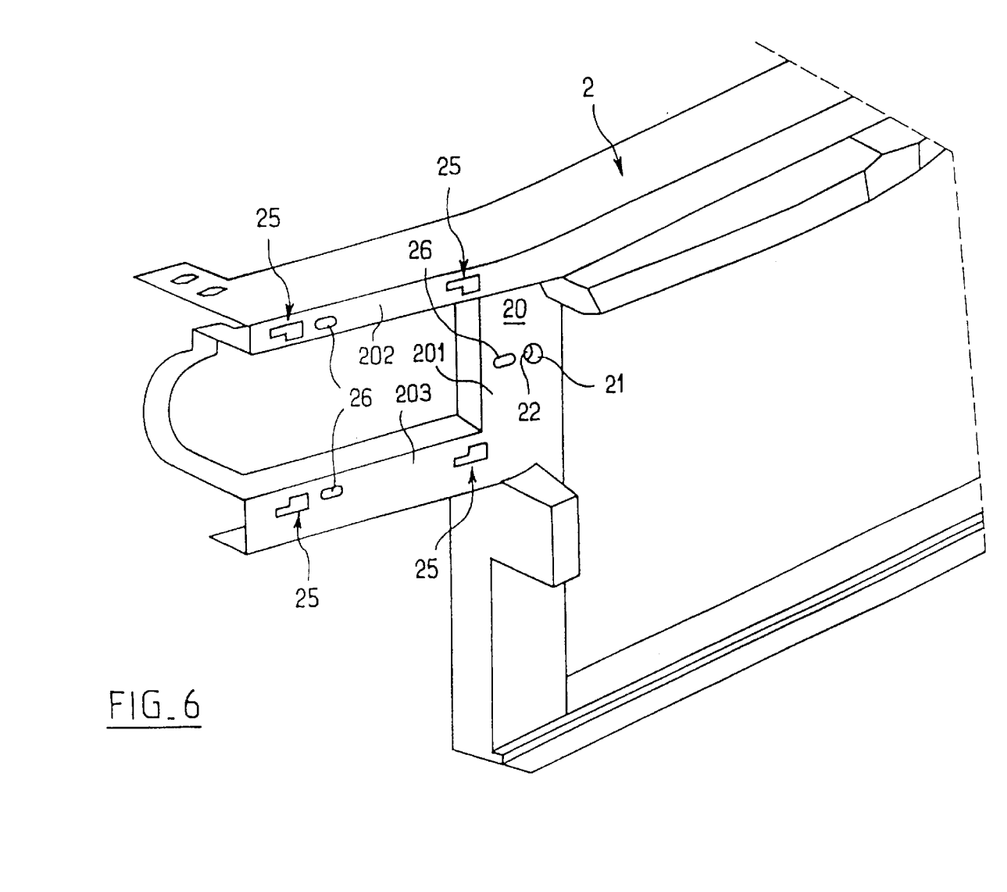
FIG. 6 is a diagrammatic half-view in perspective of a structural element of a vehicle, onto which can be mounted a headlamp equipped with means according to the invention.

By reference now to FIG. 6, an element has been represented diagrammatically known as "front face" of the vehicle, designated overall by the reference 2, a lateral extension 20 of which, intended specifically to accommodate the headlamp, constitutes the abovementioned structural part.

This structural part 20 possesses an upright 201 in which are formed the aperture 22 and its collar 21, from which two essentially horizontal and mutually parallel members 202 and 203 extend outwards.

Four generally L-shaped through apertures 25, such as will be described in detail later, are formed substantially at the four corners of a rectangle in these members 202, 203.

Three apertures 26, oblong in the horizontal direction, are also formed in these members and are intended to interact with centering pins formed at the rear of the headlamp casing in order to provide for correct positioning thereof during the operation of the hooking means, such as will be described later, which interact with the apertures 25, and of the fixing device described above by reference to FIGS. 1 to 5.

As can be seen moreover in FIG. 6, the front face 2 is intended to occupy substantially the entire width of the vehicle in the frontal region thereof, in order to accommodate, on the one hand, the left-hand and right-hand headlamps, and, on the other hand, other members of the vehicle such as the radiator or radiators, the associated motor-driven fan unit or units, etc.

Figure 7:
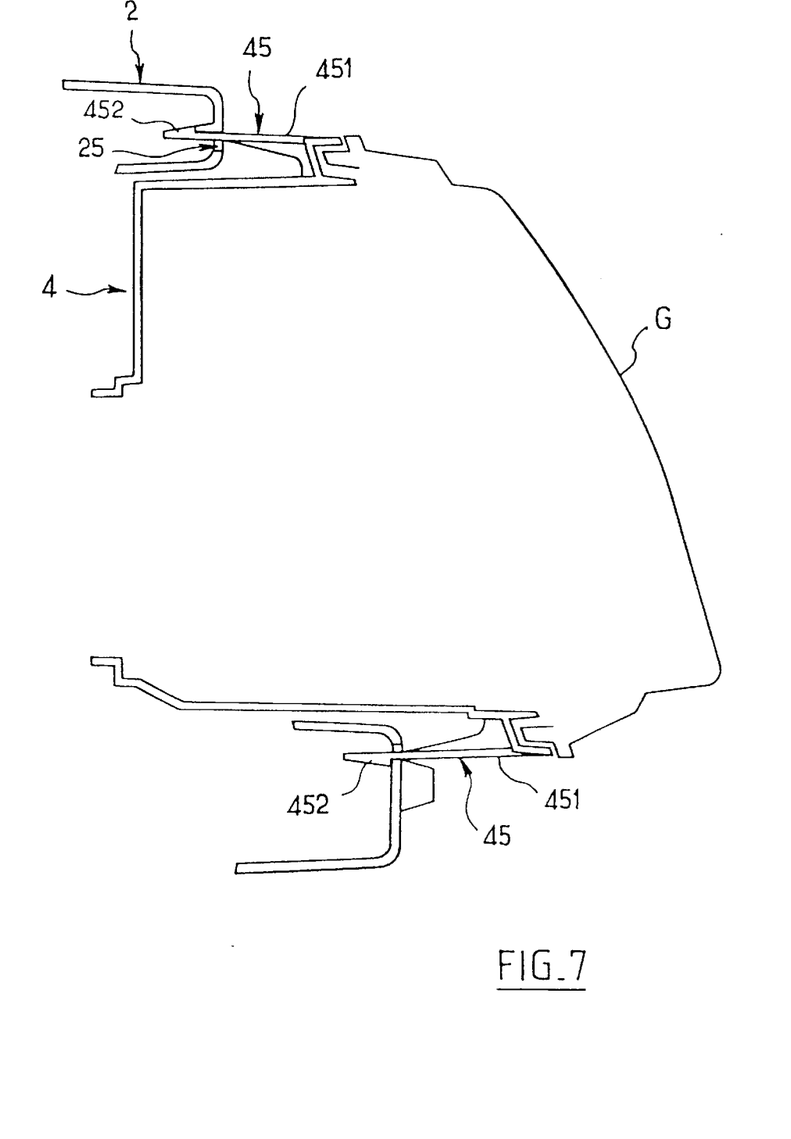
FIG. 7 is a diagrammatic vertical section of the headlamp mounted on the structural element of FIG. 6 by the use of pre-mounting means.

By reference now to FIG. 7, the whole of the headlamp has been represented diagrammatically, particularly with a casing 4 and glazing G.

At the locations corresponding to the four through apertures 25 of the structural part 20, the casing possesses four lugs, designated overall as 45, which extend rearwards and which each include a generally flat linking part 451 of flattened rectangular section, and a terminal part 452 possessing a protuberance of generally triangular profile directed upwards or downwards, depending on whether the lug is situated at the top or bottom, in such a way as to form a hooking tooth. The way in which these hooking lugs 45 interact with the apertures 25 described above will be explained later.

Figure 8:
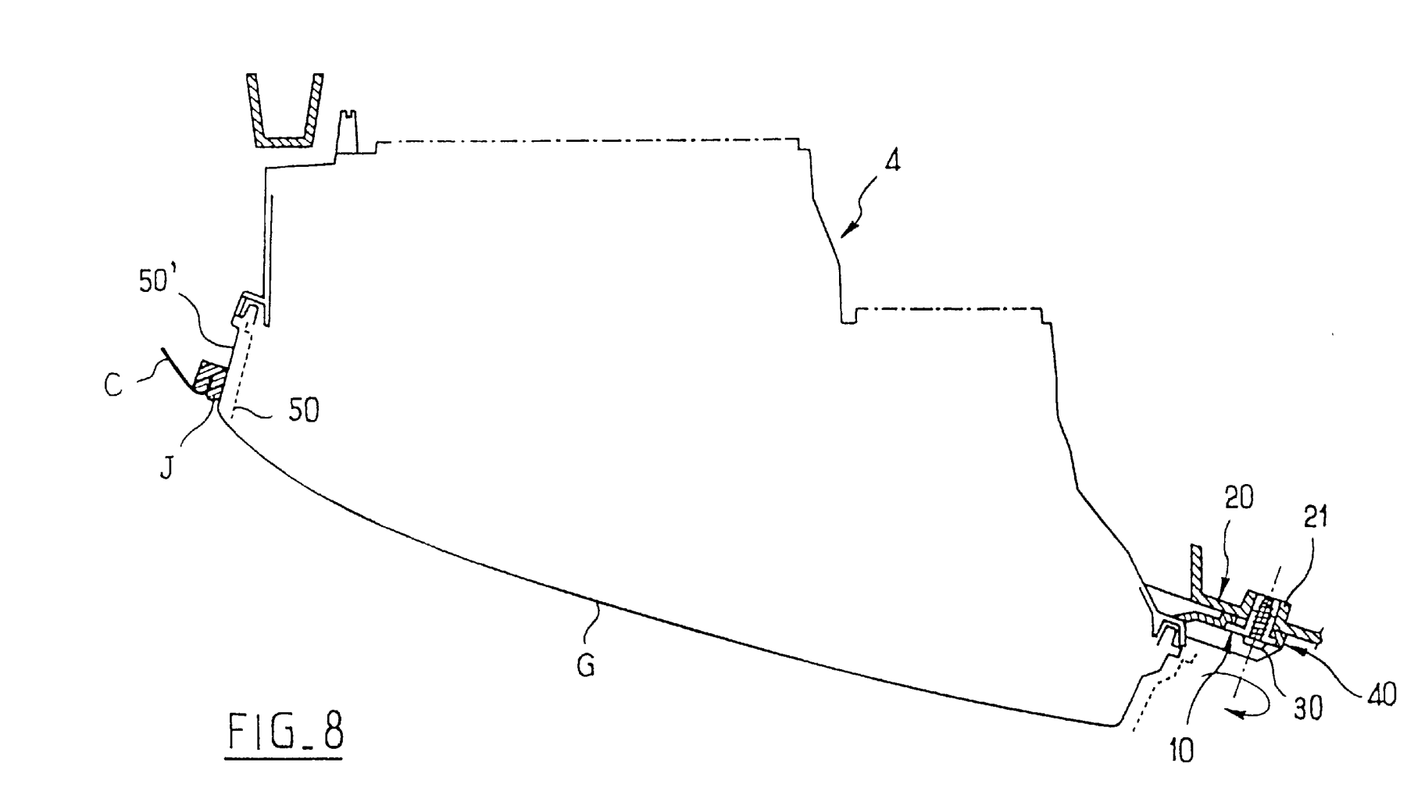
FIG. 8 is a diagrammatic horizontal section showing an arrangement for setting up the headlamp as well as a mounting device as illustrated in FIGS. 1 to 5, FIGS. 9a and 9b illustrate the geometric relationship between the pre-mounting means and a mounting device according to the invention, in two different positions, FIGS. 10a and 10b diagrammatically illustrate, in top view and in section, the pre-mounting means provided with play-compensating arrangements.

FIG. 8 diagrammatically illustrates the abutment means making it possible, when maneuvering the adjustable fixing device, to bring the headlamp into its reference position. The adjustable fixing device as described above is illustrated in the right-hand part of the figure, while, at the opposite end, an edge 50 of the glazing G of the headlamp is intended to come to bear against a sealing and styling gasket J mounted on the bodywork C in the region of the aperture formed therein in order to house the glazing of the headlamp.

Before maneuvering the adjustable fixing device, the abovementioned edge occupies the position indicated at 50 and illustrated in dots and dashes.

During the intermediate phase of the maneuvering of the adjustable fixing device, the said edge is shifted into the position indicated at 50' and illustrated in solid line, that is to say bearing against the seal J.

According to a variant which is not illustrated, provision may be made for the reference position of the headlamp in the lateral direction to be given by a particular arrangement of the casing 4 of the headlamp in cooperation with other arrangements of the bodywork, involving or not involving the styling seal surrounding the headlamp.

By reference now to FIGS. 9a and 9b, the combined behavior of the adjustable fixing device described by reference to FIGS. 1 to 5 and of the hooking means 25, 45 will now be described during the lateral translation of the headlamp caused by the said adjustable fixing device.

Figure 9A:
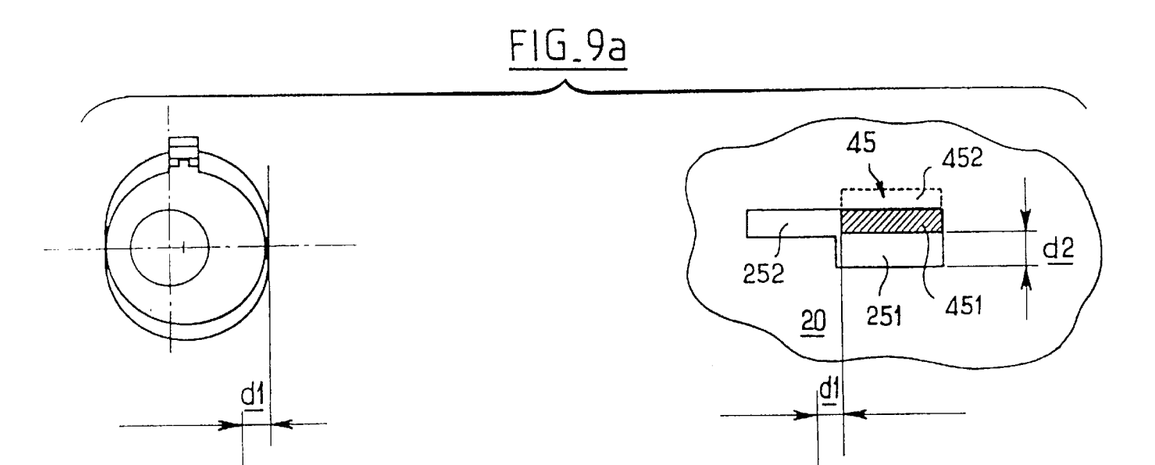

FIG. 9a illustrates the position of the assembly just after the fixing of the barrel 11 of the adjustable fixing device into the aperture 22 of the structural part 20 of the vehicle. It is in the course of this same stage, as the right-hand part of FIG. 9 illustrates, that each hooking lug 45 will be able to be engaged in the through aperture 25 of this same structural part 20. It is observed here that each of these apertures 25 possesses a right-hand part 251 and a left-hand part 252 both exhibiting substantially the same width, and that the right-hand part possesses a height which is substantially equal to twice that of the left-hand part 252, the upper edges of the said left-hand and right-hand parts being aligned. The difference in height between these left-hand and right-hand parts is indicated at d2. It is observed moreover that the height or thickness of the linking part 451 of each lug 45 is very slightly less than the height of the left-hand part 252 of the aperture 25, and that the overall height of the terminal part 452 of the lug 45 is slightly less than the height of the right-hand part 251 of the aperture 25.

The position of the apertures 25 with respect to that of the aperture 22 on the part 20 of the front face 2 is such that, in the position immediately preceding the fitting of the barrel 11 into the aperture 22, each lug 45 at the same time faces the highest part 251 of the associated aperture 25, so that it can be engaged therein. By pushing the headlamp towards the rear of the vehicle, on the one hand the barrel 11 is engaged in the aperture 22, and, on the other hand, each hooking lug 45 is engaged into its aperture 25, this movement being accompanied by a slight bending of the lug 45 downwards, until the tooth formed by its terminal part 452 comes to hook behind the upper edge of the said aperture 25 in the region of its right-hand part 251.

When the adjustable fixing device is then put into use as described above, by rotation along the arrow F (FIG. 9b), a translation of the headlamp ensues, leftwards over a distance d1, until it arrives in the reference position defined by the abutment means described above. This position [lacuna] illustrated in FIG. 9b, and it is observed that the linking parts 451 of the hooking lugs 45 have then become engaged in the lower-height regions 252 of the apertures 25, in order thus to obtain secured hooking, in which the headlamp cannot be withdrawn-unless the adjustable fixing device is unscrewed-except by breaking the hooking lugs.

Hence the adjustable fixing device and the hooking means interact to achieve not only locking of the headlamp in the desired reference position, but also to render the fixing of the headlamp essentially inviolable.

It will be understood that the amount of the eccentricity in the region of the dowel 10, as well as the dimensions of the apertures 25 in the horizontal direction, are determined in such a way as to be able to cope with all the manufacturing tolerances likely to be encountered, which themselves determine the same number of different reference positions of the headlamp.

It will be observed here that the setting-up of the headlamp casing 4 in the vertical direction is advantageously carried out by virtue of the centering pins provided on the casing of the headlamp and engaged in the oblong apertures 26 of the structural part 20, as set out above. The lugs 45 interacting with the apertures 25 may also, in a variant, provide for all or part of this vertical setting.

Figure 9B:
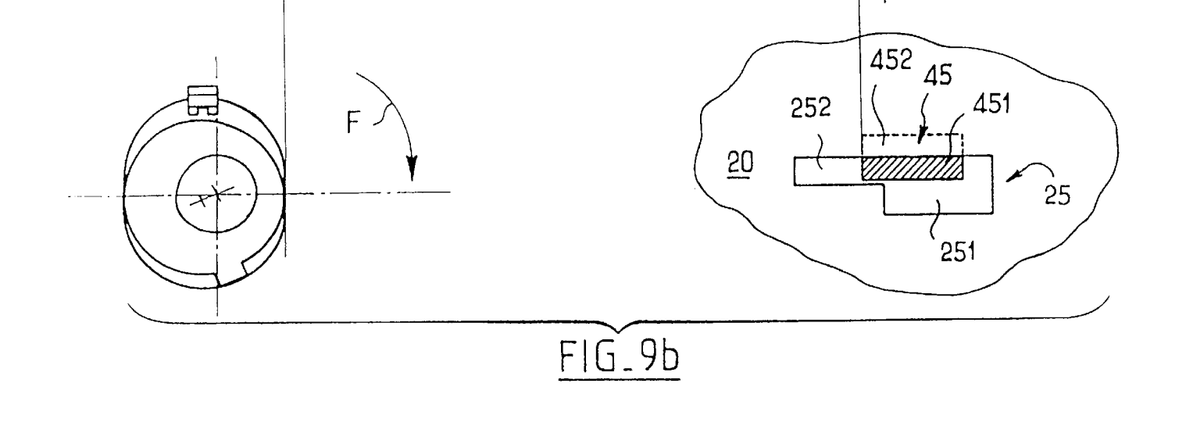

It will be noted here that FIGS. 9a and 9b are regarded as illustrated [sic] only the corresponding states of the hooking means and of the adjustable fixing device before and after locking, but are not in any way regarded as illustrating the actual position of these means on the casing 4 of the headlamp and on the structural part 20.

It may moreover be useful to take action to eliminate any play existing in the front-to-rear direction (that is to say along the axis of the vehicle) between the hooking lugs 45 and the structural part 20 after final fixing.

Figure 10A:
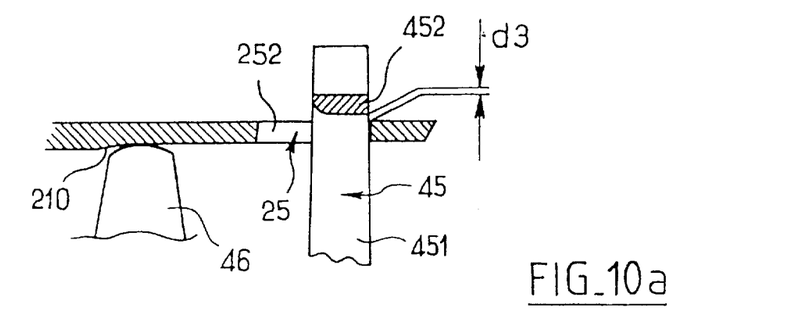
Figure 10B:
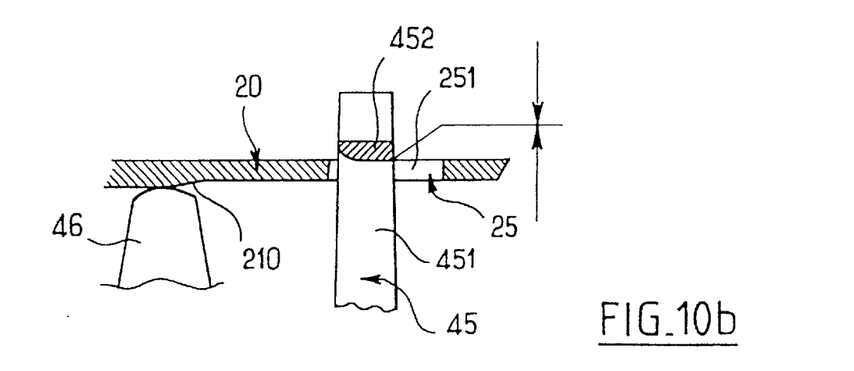

Hence means have been represented in FIGS. 10a and 10b for compensating for the play, which here comprise a ramp 210 formed on a front face of the structural part 20 in the vicinity of the aperture 25, this ramp being suitable for interacting with a boss 46 made of the same material, for example, to the rear of the headlamp in the vicinity of each associated lug 45.

The positions of FIGS. 10a and 10b correspond respectively to those of FIGS. 9a and 9b. It is observed that, upon passing from the position of FIG. 10a to that of FIG. 10b, the ramp 210 pushes the boss 46, that is to say the casing of the headlamp itself, which has the effect of pushing the hooking lug 45 towards the front of the vehicle (downwards in FIGS. 10a and 10b), so that the play (distance d3) existing before locking is brought down to zero during the locking operation consisting of the translation of the headlamp from the right to the left.

Figure 11:
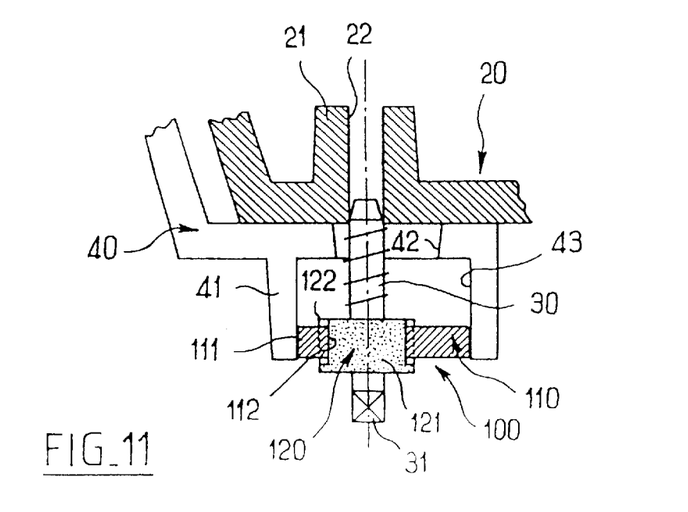
FIG. 11 is a view in axial section of an adjustable mounting device according to a variant embodiment of the invention.

By reference now to FIG. 11, a variant embodiment of the adjustable fixing device illustrated in FIGS. 1 to 5 has been illustrated diagrammatically. In FIG. 11, elements or parts identical or similar to those of FIGS. 1 to 5 are designated as far as possible by the same reference signs.

According to this variant, the dowel, here referenced 100, is constituted of two parts 110, 120, produced in a single piece but linked by frangible parts capable of being broken when an excessive torque is applied between these two parts.

More precisely, an outer disk-shaped part 110 is linked by fragile areas 122 to an internal part 120 in the shape of a disk of smaller diameter and arranged eccentrically with respect to the outer part.

Moreover, the part 120 is traversed by a passage (not represented) of non-circular cross section, for example of square cross section, complementary with a part 31 of the screw 30. The screw 30 here is screwed directly into the aperture 22 delimited by the collar 21, the whole being formed in the structural part 20 as before.

When the screw 30 is screwed, it starts by simultaneously entraining in rotation parts 110 and 120 of the dowel 100, and the said part 120 acts on the low wall 41 so as to shift the whole of the headlamp in lateral translation as before. Next, as soon as the headlamp reaches its reference position as defined by the abutment means, the low wall 41 opposes the continuation of the rotation of the part 120, and the fragile parts 122 break. With the rotation of the screw 30 continuing, it continues to entrain the part 110, until the latter is firmly applied against the bottom of the housing 43 to achieve final locking.

According to another embodiment variant, not illustrated, it is advantageous to place the dowel-type adjustable fixing device under the hood of the vehicle, so as to limit its accessibility and thus actually guarantee the inviolability of the headlamp.

Needless to say, the invention is not at all limited to the embodiments described and represented, but the person skilled in the art will know how to apply any variant or modification to it in accordance with its spirit.

What is claimed is:

1. An adjustable mounting device for a motor vehicle lighting apparatus, comprising:
   a fixing member rotatably interacting with a structural part of the vehicle,
   a dowel having a circular part, and
   an appendage coupled to the lighting apparatus having the circular part seated therein for forming a cam with the circular part such that the fixing member is positioned eccentrically about the circular part for the fixing member to drive the dowel such that initial rotation of the fixing member rotates the circular part pushing the lighting apparatus in a direction toward a lateral extremity of the structural part of the vehicle.

2. An apparatus according to claim 1, wherein the fixing member comprises a screw.

3. An apparatus according to claim 2, wherein the screw entrains the dowel in rotation via the interaction of limited friction between the threading of the screw and a passage formed in the dowel for the screw to pass into.

4. An apparatus according to claim 3, wherein the dowel has a barrel accommodating the screw and able to be engaged closely in an aperture formed in the structural part of the vehicle.

5. An apparatus according to claim 4 wherein the barrel comprises a plurality of branches able to be stressed by the screw, when it is screwed up, towards a wall of the structural part delimiting the aperture.

6. An apparatus according to claim 2, wherein the dowel comprises two parts linked by at least one frangible area, an inner part being integral in rotation with the screw while an outer part forms a cam.

7. An apparatus according to claim 6 wherein the screw is screwed directly into an aperture formed in the structural part of the vehicle.

8. An apparatus according to claim 1, wherein the circular part acts on a low wall surrounding the appendage in which the circular part is held.

9. An apparatus according to claim 1, wherein the lighting apparatus possesses at least one pre-mounting lug possessing a terminal hooking part and able to interact with an aperture formed in the structural part.

10. A structural element for a motor vehicle, intended to accommodate at least one item of apparatus according to claim 9, comprising at least one first aperture accommodating the fixing member belonging to the adjustable fixing device, and at least one second aperture intended to accommodate a premounting lug of the apparatus while allowing it to be displaced in the direction toward the lateral extremity of the structural part of the vehicle, the second aperture having width, measured transversely to the direction toward the lateral extremity of the structural part of the vehicle, which reduces when the slot is traveled along the direction toward the lateral extremity of the structural part of the vehicle.

11. A structural element according to claim 10, wherein each second aperture, along the direction toward the lateral extremity of the structural part of the vehicle, comprises a first part with a first constant width followed by a second part with a second constant width less than the first one.

12. A structural element according to claim 11, wherein the first constant width is greater than the overall thickness of an associated pre-mounting lug, and wherein the second constant width is slightly greater than the thickness of a linking part of the lug.

13. A structural element according to claim 10, comprising in the vicinity of each second aperture, a ramp able to force the associated pre-mounting lug in a direction tending to extract it from the second aperture.

14. An assembly of a structural element according to claim 10, and at least one lighting or signaling apparatus.

15. A structural element for a motor vehicle, comprising a single-piece component intended to extend at the front of the vehicle over a substantial part of its width and possessing, in the region of its two lateral extremities, arrangements for mounting and fixing of two items of apparatus according to claim 1, constituting left-hand and right-hand headlamps.

* * * * *